(12) United States Patent
Gu (10) Patent No.: US 12,091,116 B1
(45) Date of Patent: Sep. 17, 2024

(54) BICYCLE PARKING DEVICE

(71) Applicant: Haidong Gu, Montclair, CA (US)

(72) Inventor: Haidong Gu, Montclair, CA (US)

(73) Assignee: CYCLINGDEAL USA, INC., CA (US)

( * ) Notice: Subject to any disclaimer, the term of this patent is extended or adjusted under 35 U.S.C. 154(b) by 0 days.

(21) Appl. No.: 18/534,728

(22) Filed: Dec. 11, 2023

(51) Int. Cl.
  *B62H 3/08* (2006.01)
  *B62H 3/06* (2006.01)
  *B62H 3/12* (2006.01)

(52) U.S. Cl.
  CPC ............... *B62H 3/08* (2013.01); *B62H 3/06* (2013.01); *B62H 3/12* (2013.01)

(58) Field of Classification Search
  CPC ... B62H 3/00; B62H 3/04; B62H 3/12; B62H 3/08; B62H 3/06; A47F 5/04; A47F 5/06; B25H 1/0007; B25H 1/0014; B25B 5/147
  See application file for complete search history.

(56) References Cited

U.S. PATENT DOCUMENTS

| | | | | |
|---|---|---|---|---|
| 2,710,051 A | * | 6/1955 | Greenberg | A47C 7/70 297/170 |
| 3,352,426 A | * | 11/1967 | Carlson | A63B 69/16 482/61 |
| 4,248,161 A | * | 2/1981 | Adair | A47B 27/02 D6/656.11 |
| 5,082,120 A | * | 1/1992 | Vega | B62H 3/12 211/20 |
| 5,454,473 A | * | 10/1995 | Hennessey | A47F 5/04 211/85.6 |
| 5,544,763 A | * | 8/1996 | McClain | B25H 1/0014 248/176.1 |
| 5,690,260 A | * | 11/1997 | Aikins | B60R 9/10 224/532 |
| 5,833,074 A | * | 11/1998 | Phillips | B60R 9/10 211/21 |
| 5,967,946 A | * | 10/1999 | Beatty, Jr. | A63B 69/16 482/61 |
| 6,679,388 B1 | * | 1/2004 | Chiu | B62H 3/12 248/170 |
| 7,341,006 B2 | * | 3/2008 | Hernandez | A47B 3/0815 108/115 |
| 9,233,463 B2 | * | 1/2016 | Erickson | B25H 1/0014 |
| 9,585,467 B2 | * | 3/2017 | Leng | A47B 21/02 |
| 9,650,092 B1 | * | 5/2017 | Tsai | B62H 3/08 |
| D855,008 S | * | 7/2019 | Man | D12/407 |
| 11,008,060 B1 | * | 5/2021 | Liu | B62H 3/10 |
| 11,505,267 B1 | * | 11/2022 | Gu | B62H 3/04 |
| 2015/0231780 A1 | * | 8/2015 | Hirokawa | B25H 1/0014 248/670 |

* cited by examiner

Primary Examiner — Ko H Chan (57) ABSTRACT

The present invention relates to a bicycle parking structure, which includes a base assembly, having a front end portion and a rear end portion; a front frame assembly, pivotally mounted at the front end portion for supporting a front wheel or a rear wheel of a bicycle; a rear frame assembly, disposed at the rear end portion and including a base rod, at least one auxiliary rod and a telescopic rod, wherein the at least one auxiliary rod is detachably mounted at a top end of the base rod, and the telescopic rod is directly assembled to the top end of the base rod or to a top end of the at least one auxiliary rod; and a middle frame assembly, disposed between the front and rear frame assemblies and including two middle connecting plates, two side upright rods, and a bracing member.

10 Claims, 11 Drawing Sheets

BICYCLE PARKING DEVICE

BACKGROUND OF THE INVENTION

Fields of the Invention

The present invention relates to a bicycle parking structure, particularly applicable to the field of bicycles, providing stable placement for bicycles in any form.

Descriptions of Related Art

There are various types, sizes, and shapes of bicycles. In order to provide the best service, various types of bicycles are displayed and sold to consumers by relevant stores. However, extremely large space is required for displaying and selling a large number of bicycles, and not every location has such a large space available. Therefore, accommodating a large number of bicycles in a certain space is a problem, and choosing among bicycles can be troublesome for consumers. Aside from the difficulty of focusing on judgment and observation, there might also be obstructions affecting the safe passage. Therefore, how to arrange bicycles in a restricted space and environment has become a concern for professionals in the relevant industry.

SUMMARY OF THE INVENTION

The primary objective of the present invention is to provide optimal placement for different types of bicycles in a limited space and environment, allowing the use of space and environment to be optimized for browsing various types of bicycles. This addresses the issues found in the prior art that in the limited space, only a single placement direction is used, and bicycles of different types are placed in a disorderly manner, making the overall space and environment overly crowded and making it difficult for visitors and buyers to observe bicycles up close. In serious cases, it may lead to the lack of safety passages.

In order to achieve the above objectives and effects, the present invention provides a bicycle parking structure, which comprises: a base assembly, including a front end portion and a rear end portion; a front frame assembly, pivotally mounted at the front end portion and configured to support a front wheel or a rear wheel of a bicycle; a rear frame assembly, disposed at the rear end portion and including a base rod, at least one auxiliary rod and a telescopic rod, wherein (i) a top surface of the rear end portion is equipped with a rear connecting plate extending upwardly relative to the rear end portion, (ii) the rear connecting plate has a rear arc guide hole extending through on one side thereof, (iii) the base rod has one end with a side detachably and pivotally connected to the rear arc guide hole, (iv) the at least one auxiliary rod is detachably mounted at a top end of the base rod, (v) the telescopic rod can be directly assembled to the top end of the base rod or to a top end of the at least one auxiliary rod, and (vi) the telescopic rod has a main rod and a secondary rod, with one end of the secondary rod being inserted into the main rod for up-down telescopic movement relative to the main rod, and the other end of the secondary rod being equipped with a support frame; and a middle frame assembly, disposed between the front frame assembly and the rear frame assembly and including two middle connecting plates, two side upright rods, and a bracing member, wherein the two middle connecting plates are disposed on and extend upwardly from the base assembly and each has a middle arc guide hole extending through one side thereof, and wherein each of the side upright rods has one end detachably and pivotally disposed at the corresponding middle arc guide hole and the other end to which a respective one of two ends of the bracing member is pivotally mounted.

DETAILED DESCRIPTION OF THE PREFERRED EMBODIMENT

Please refer to FIGS. 1 to 11 for a bicycle parking structure of the present invention, mainly used for supporting bicycle 100. It comprises a base assembly 1, including a front end portion 11 and a rear end portion 12; a front frame assembly 2, pivotally mounted at the front end portion 11 and designed to support a front wheel or a rear wheel of a bicycle 100, limiting and preventing lateral movement of the wheel supported thereby; and a rear frame assembly 3, disposed at the rear end portion 12 and including a base rod 31, at least one auxiliary rod 32 (some drawings show multiple auxiliary rods 32, which can be increased or decreased in amount based on the placement situation of the bicycle 100), and a telescopic rod 33. The top surface of the rear end portion 12 is equipped with a rear connecting plate 4, extending upwardly relative to the rear end portion 12. The rear connecting plate 4 has a rear arc guide hole 41 extending through one side thereof. The base rod 31 has one end with a side abutting against an outer side of the rear connecting plate 4 and is equipped with a slider 311 protruding therefrom and corresponding to the rear arc guide hole 41. The slider 311 is inserted into the rear arc guide hole 4 and allows movement along the hole-shaped trajectory defined by the rear arc guide hole 41 when the base rod 31 is pivoted. The at least one auxiliary rod 32 is detachably mounted at the top end of the base rod 3. The telescopic rod 33 can be directly assembled to the top end of the base rod 31 or to the top end of the at least one auxiliary rod 32. The telescopic rod 33 has a main rod 331 and a secondary rod 332, with one end of the secondary rod 332 inserted into the main rod 331 for up-down telescopic movement relative to the main rod 331. The other end of the secondary rod 332 is equipped with a support frame 5. The bicycle parking structure of the present invention further comprises a middle frame assembly 6 between the front frame assembly 2 and the rear frame assembly 3. The middle frame assembly 6 includes two middle connecting plates 61, two side upright rods 62, and a bracing member 63. The two middle connecting plates 61 are disposed on and extend upwardly from the base assembly 1. Each of the middle connecting plates 61 has a middle arc guide hole 611 extending through one side thereof. Each of the side upright rods 62 has one end detachably and pivotally disposed at its corresponding middle arc guide hole 611. The bracing member 63 has two ends each pivotally mounted at the other end of each of the side upright rods 62. By adjusting the installation of the at least one auxiliary rod 32 to accommodate various placement configuration of the bicycle 100, the structure enables stable support and flexible positioning of the bicycle 100 based on different spatial and environmental conditions, effectively utilizing space.

Figure 4:
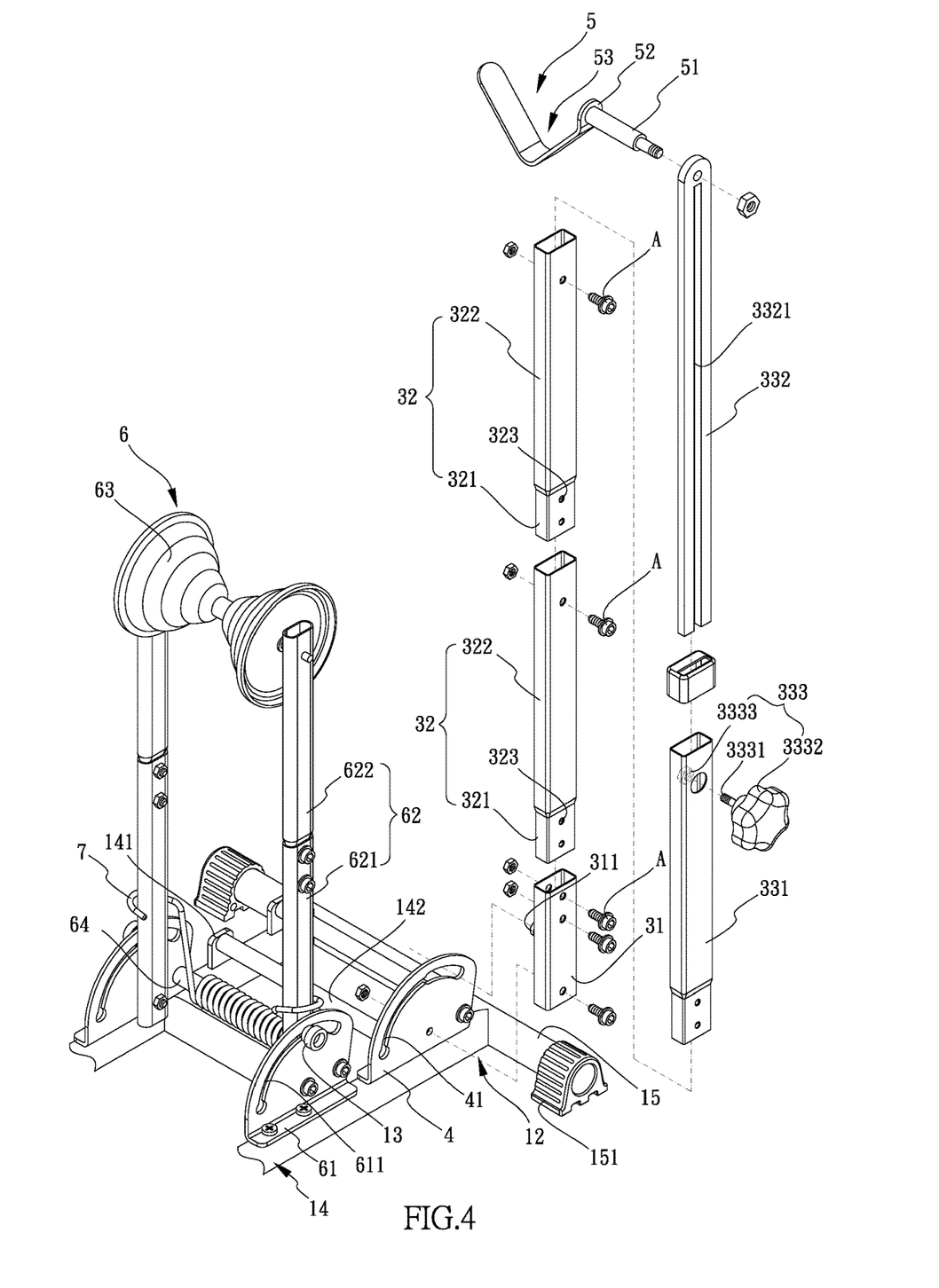
FIG. 4 is an exploded schematic view of a rear frame assembly of the present invention.
Figure 5:
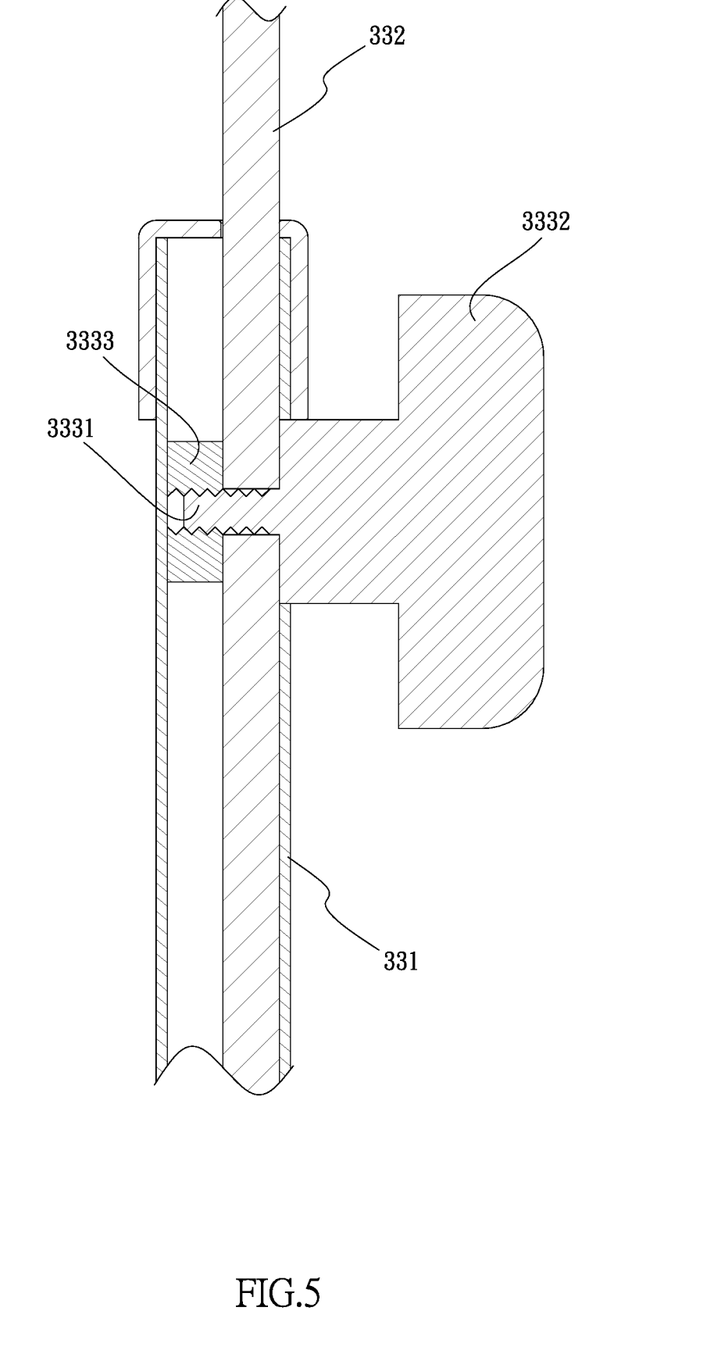
FIG. 5 is a cross-sectional schematic view taken along line V-V of FIG. 4.
Figure 6:
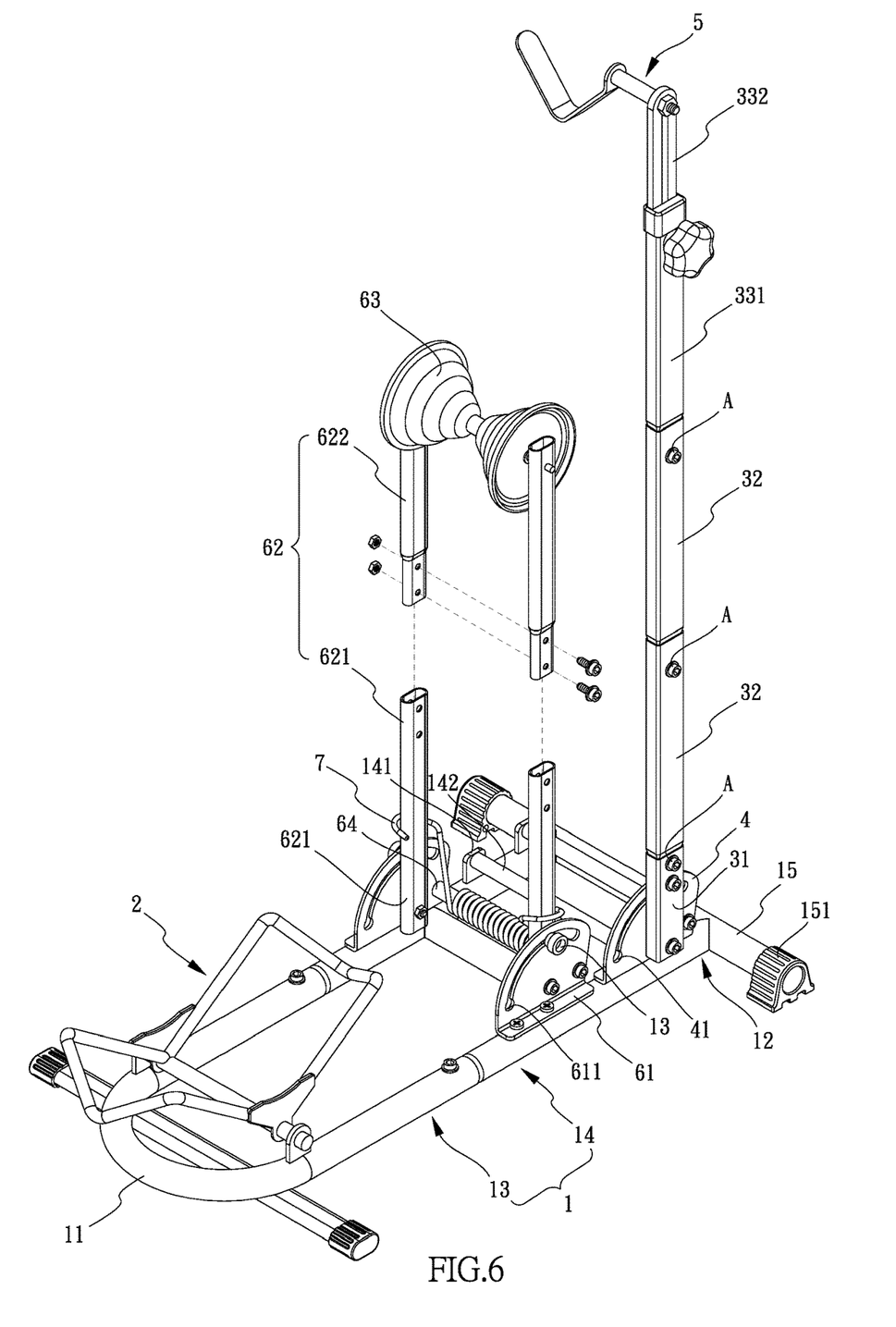
FIG. 6 is an exploded schematic view of a front frame assembly and a middle frame assembly of the present invention.
Figure 7:
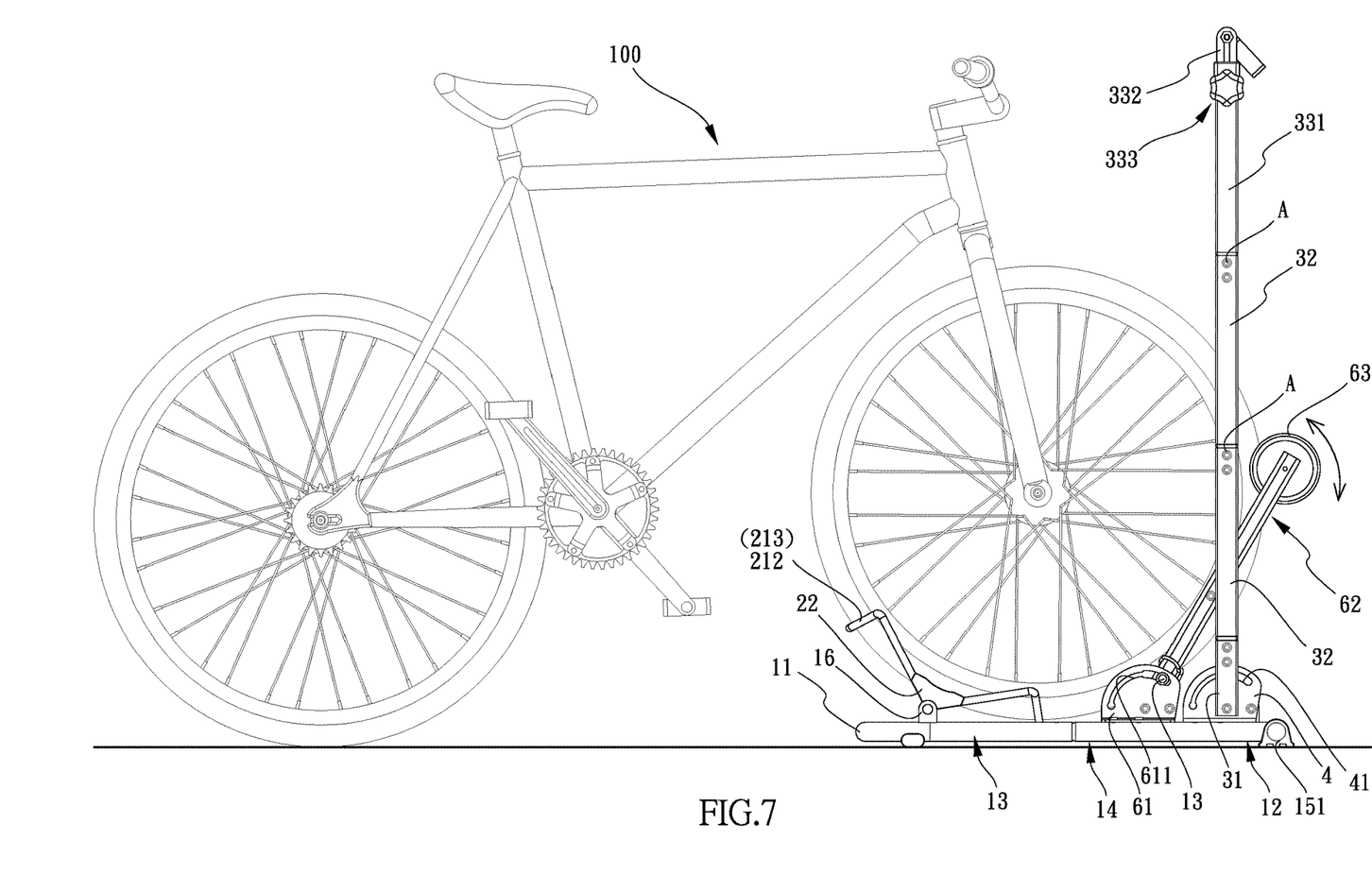
FIG. 7 is a side schematic view of a first placement configuration for supporting a bicycle according to the present invention.
Figure 8:
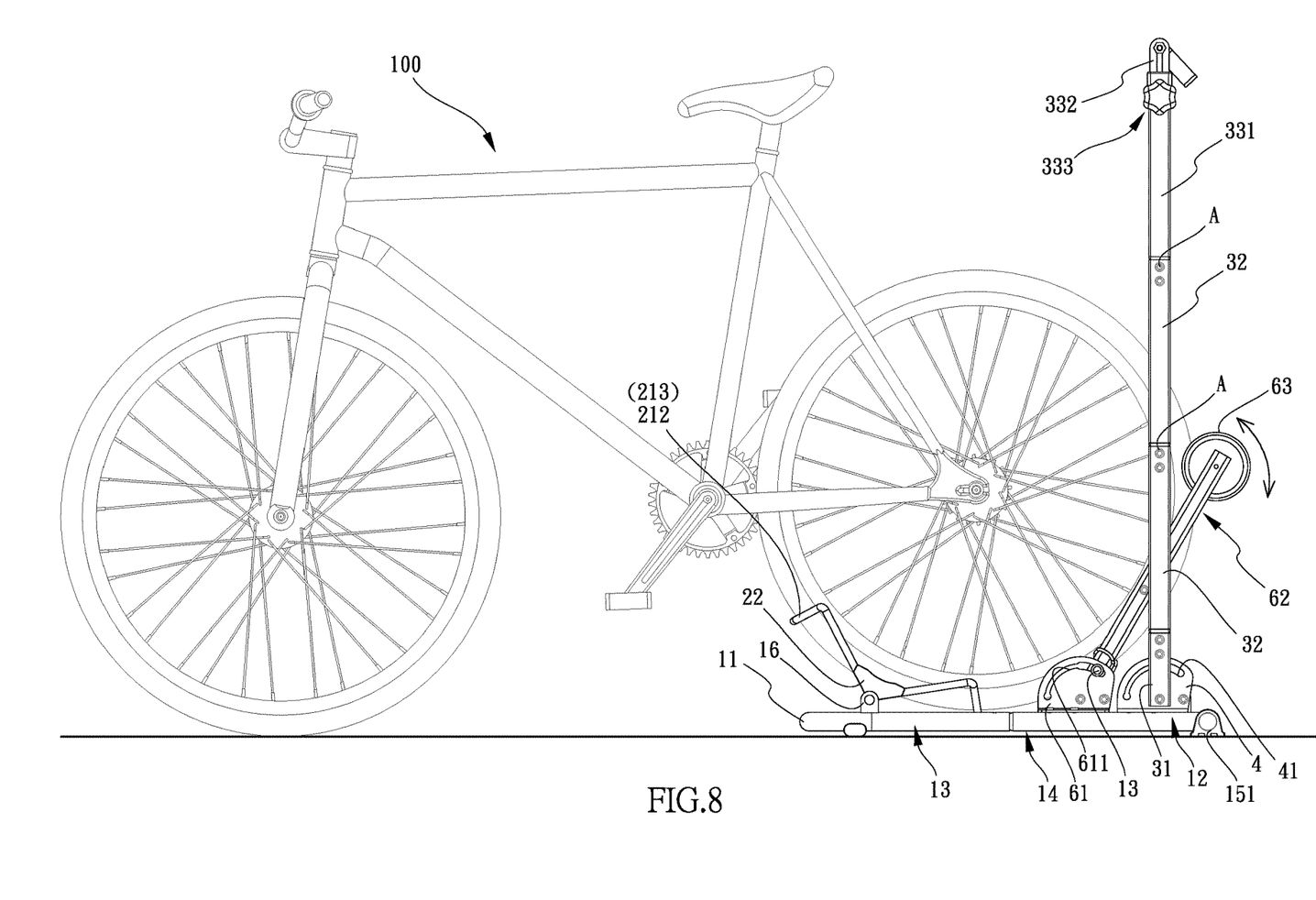
FIG. 8 is a side schematic view of a second placement configuration for supporting a bicycle according to the present invention.
Figure 9:
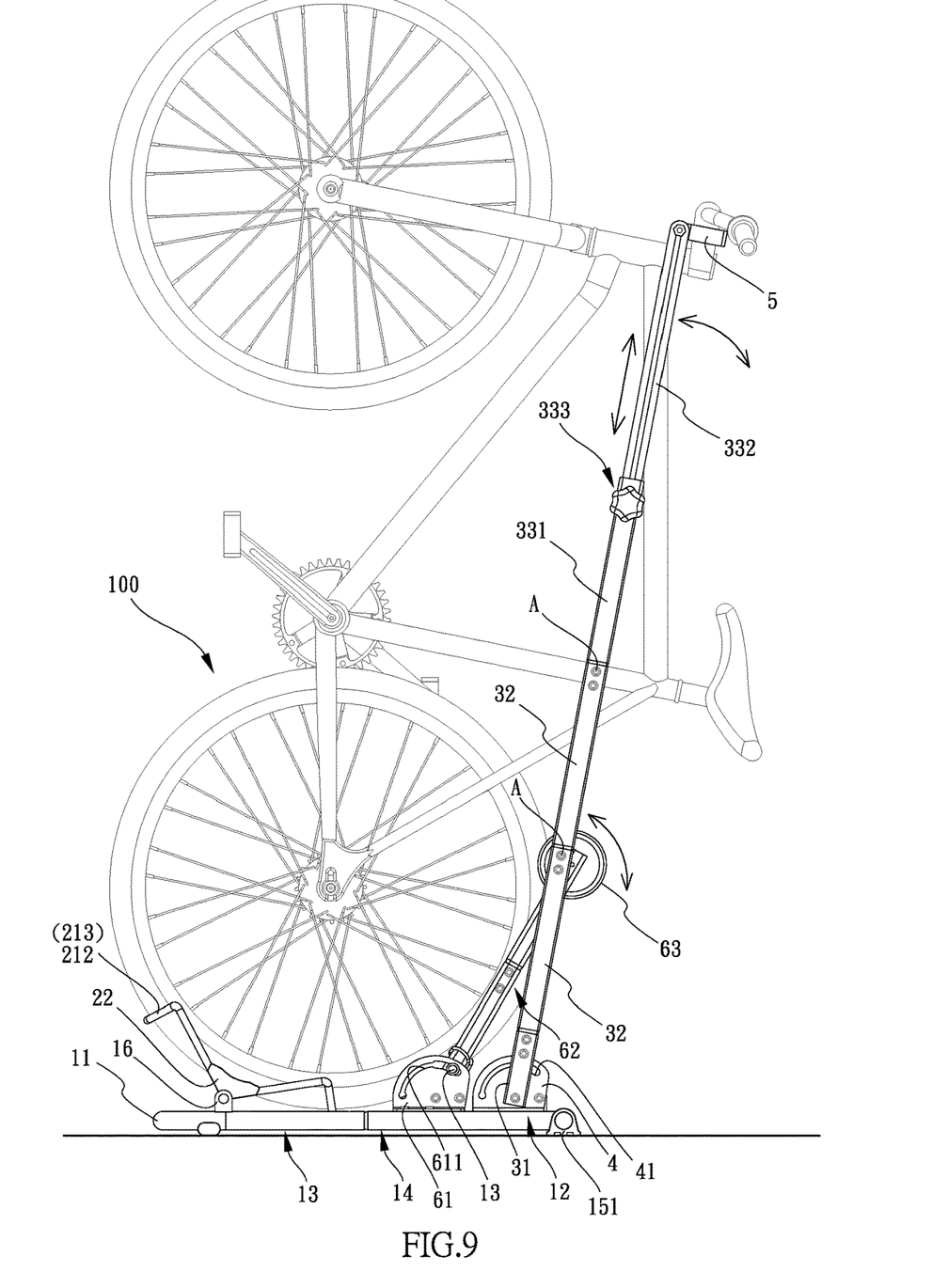
FIG. 9 is a side schematic view of a third placement configuration for supporting a bicycle according to the present invention.
Figure 10:
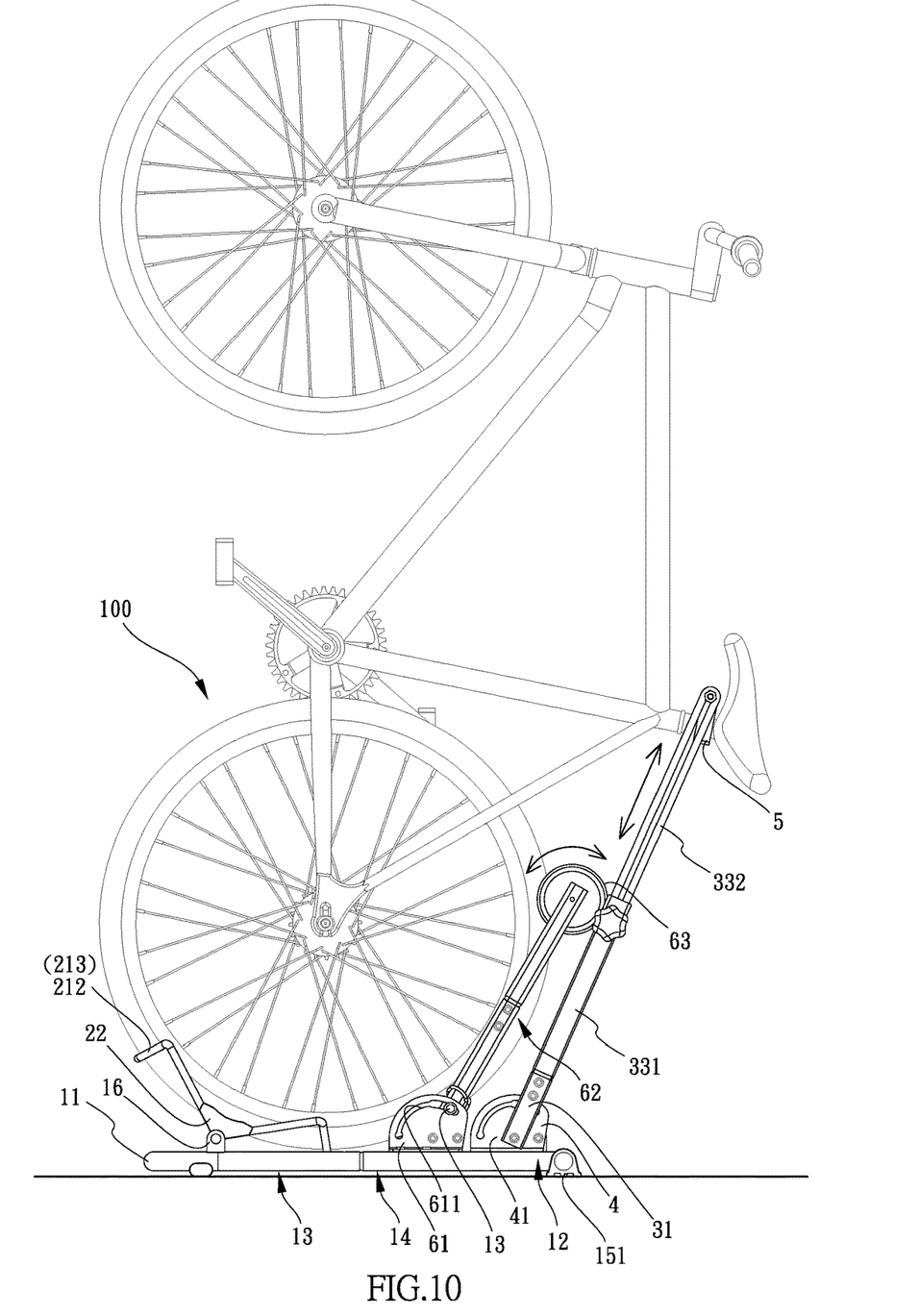
FIG. 10 is a side schematic view of a fourth placement configuration for supporting a bicycle according to the present invention.
Figure 11:
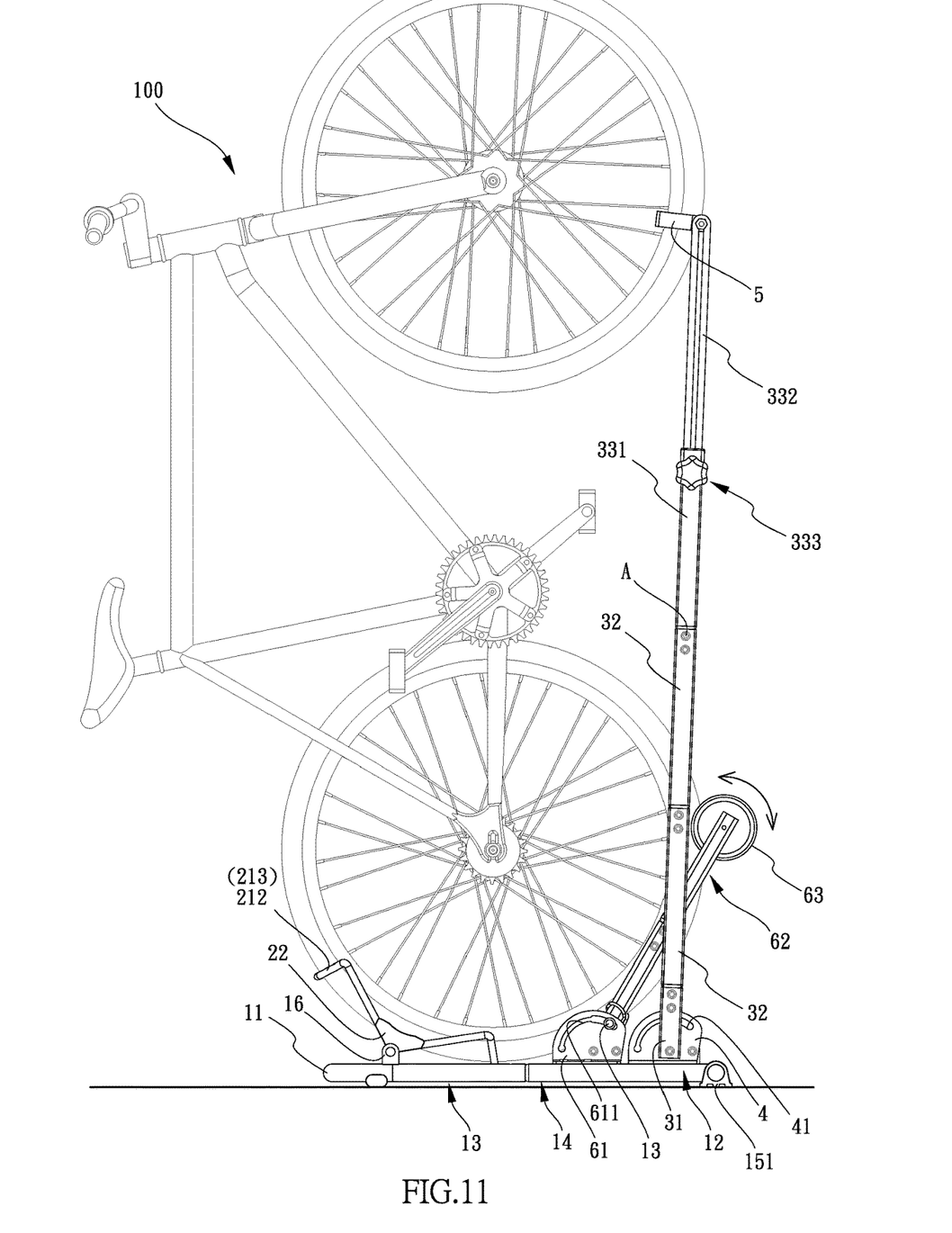
FIG. 11 is a side schematic view of a fifth placement configuration for supporting a bicycle according to the present invention.

As shown in FIGS. 4 and 5, the present invention allows for various placement configurations of the bicycle 100 by freely increasing or decreasing the auxiliary rods 32. When both the front and rear wheels of the bicycle 100 are on the ground (see FIGS. 7 and 8), the user can place the front or rear wheel on the front frame assembly 2 and support it with the middle frame assembly 6, achieving stable placement without the need for auxiliary rods 32. For intending to stand the bicycle 100, as shown in FIG. 9, with the rear wheel on the ground and the front wheel suspended, the user can increase the number of auxiliary rods 32 based on the total length of the bicycle 100 to allow the support frame 5 to be positioned at the head of the bicycle 100. Alternatively, as shown in FIG. 10, when the total length of the bicycle 100 is shorter, the user can remove the auxiliary rods 32, allowing the support frame 5 to be directly placed on the seat position of the bicycle 100. Additionally, as shown in FIG. 11, in addition to the standing placement shown in FIGS. 9 and 10, the seat position of the bicycle 100 can be keep away from the telescopic rod 33, and the front wheel of the bicycle 100 can be placed on the support frame 5. The above-mentioned five placement configurations accommodate users to optimize arrangement according to space and environment, providing efficient use of space and environment. This offers users ample viewing space, making it suitable not only for typical retail environments but also for residential use with the advantage of preventing bicycles from occupying excessive space within a residential setting. Moreover, the present invention facilitates easier operation for users with less strength in transitioning the bicycle 100 from a flat to a standing position.

Continuing from the above explanation, in order to facilitate the flexible addition and removal of the auxiliary rod 32, the auxiliary rod 32 includes an insertion part 321 and a connecting part 322. The insertion part 321 is detachably inserted into one end of the base rod 31, and the main rod 331 of the telescopic rod 33 is inserted into the connecting part 322. Additionally, the insertion part 321 is provided with a plurality of insertion holes 323, and a plurality of bolt members A, equal in quantity to the insertion holes 323, are inserted from the outer side of the base rod 3 into and through the insertion part 321. This allows users to quickly and conveniently add or remove the auxiliary rod 32, as shown in FIG. 4. The telescopic rod 33 includes a locking member 333, which includes a screw 3331, a control handle 3332 and a nut 3333. One end of the screw 3331 is connected to one side of the control handle 3332, and the other end of the screw 3331 is inserted from the outer side of the main rod 331 into and through an oblong hole 3321 of the secondary rod 332. The nut 3333 is embedded in the inner wall of the main rod 331. Accordingly, by tightening the screw 3331 and the nut 3333, the secondary rod 332 can be secured inside the main rod 331, and by loosening them, the secondary rod 332 is free to move up and down within the main rod 331, as shown in FIG. 4.

Continuing from the above, above the placement of the support frame 5, in order to stably support the placement of the seat tube, head tube, and wheel, the support frame 5 further includes a connecting segment 51 and a deformed segment 52. The connecting segment 51 has one end passing through and pivotally connected to the top end of the secondary rod 332, and the other end connected to the deformed segment 52. The deformed segment 52 extends outward from one end of the connecting segment 51 and is bent to form a recessed groove 53. A specific section of the deformed segment, which includes the recessed groove, is a rectangular sheet-like structure. The connecting segment 51 can rotate relative to the secondary rod 332, changing the orientation of the recessed groove 53 in the deformed segment 52 to accommodate various placement configurations, as shown in FIGS. 4, 9, 10, and 11.

Figure 3:
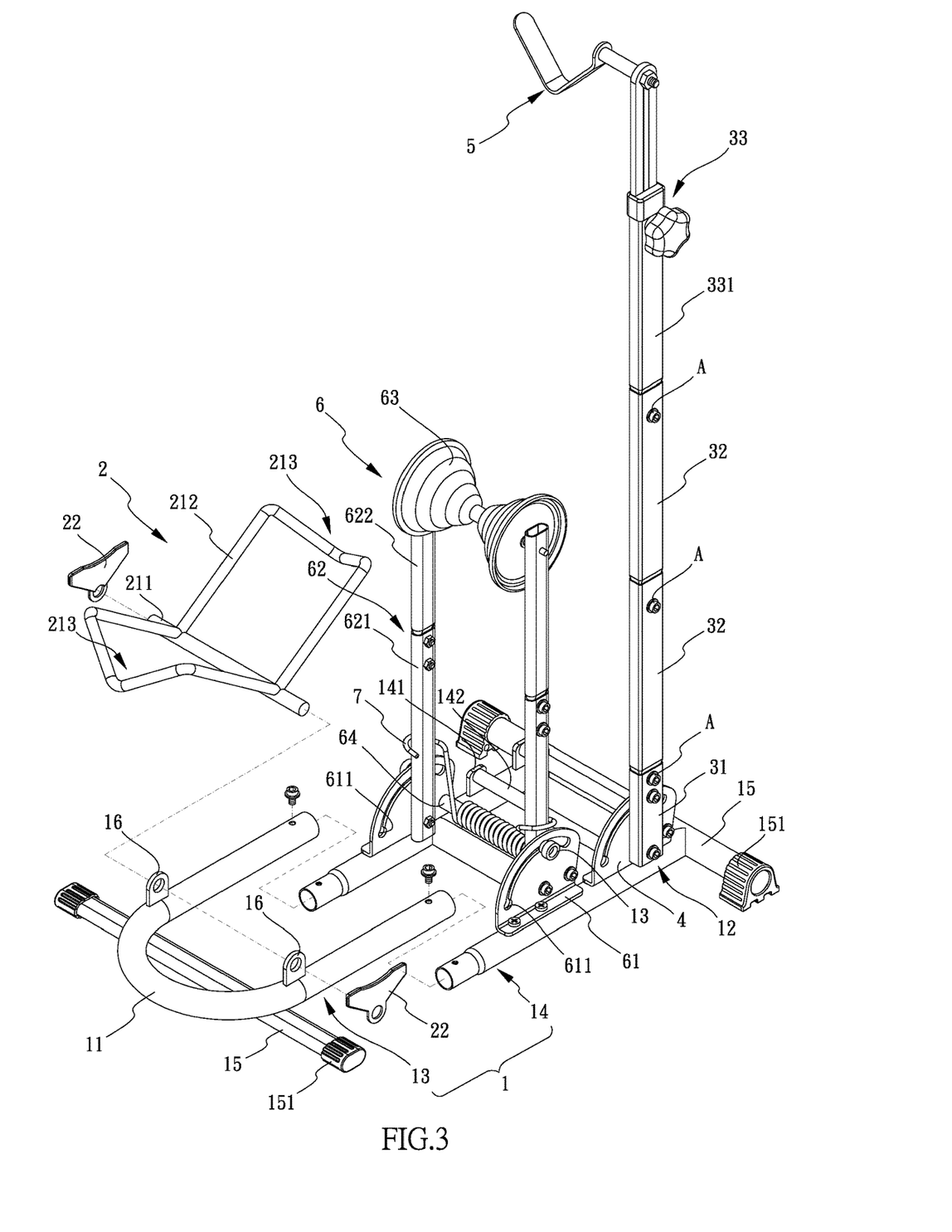
FIG. 3 is an exploded schematic view of a front base frame and a rear base frame of the present invention.

To facilitate user convenience in transportation and space-saving, the base assembly 1 further includes a front base frame 13 and a rear base frame 14. The front base frame 13 is U-shaped, and the rear base frame 14 is H-shaped. The two ends of the front base frame 13 are detachably connected to the two ends on the same side of the rear base frame 14. The front end portion 11 is located at the front base frame 13, and the rear end portion 12 is located at the rear base frame 14. Additionally, a plurality of foot bases 15 are further provided at the front edge bottom of the front base frame 13 and at the end of the rear base frame 14. Each of the foot bases 15 is covered with foot sleeves 151 at both ends thereof. Users can easily disassemble and assemble the front base frame 13 and rear base frame 14, allowing for storage in a smaller space. The placement of the foot sleeves 151 prevents direct contact between the front base frame 13/the rear base frame 14 and the ground, avoiding damage, as shown in FIG. 3.

Figure 1:
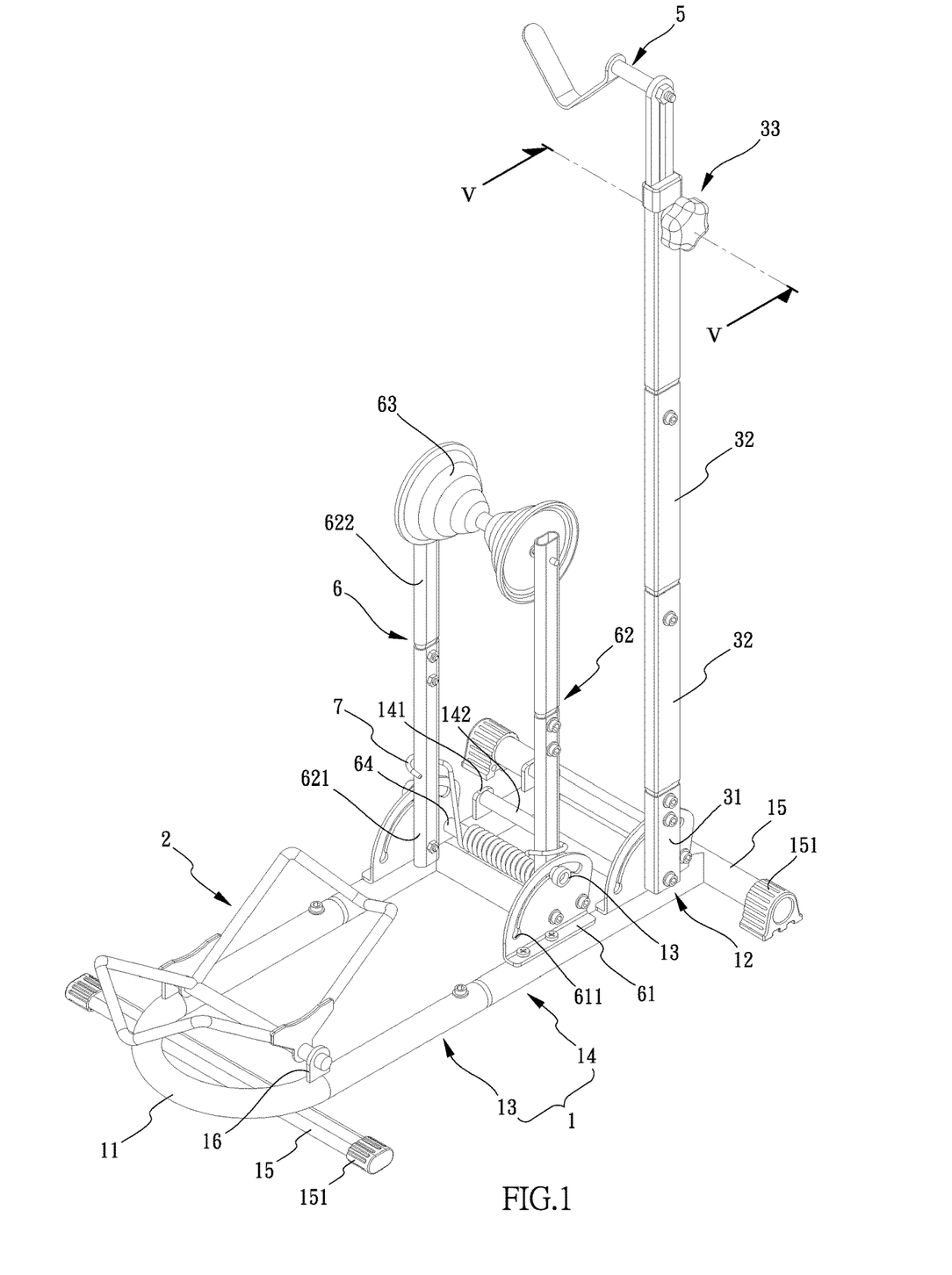
FIG. 1 is a perspective schematic view of the present invention.
Figure 2:
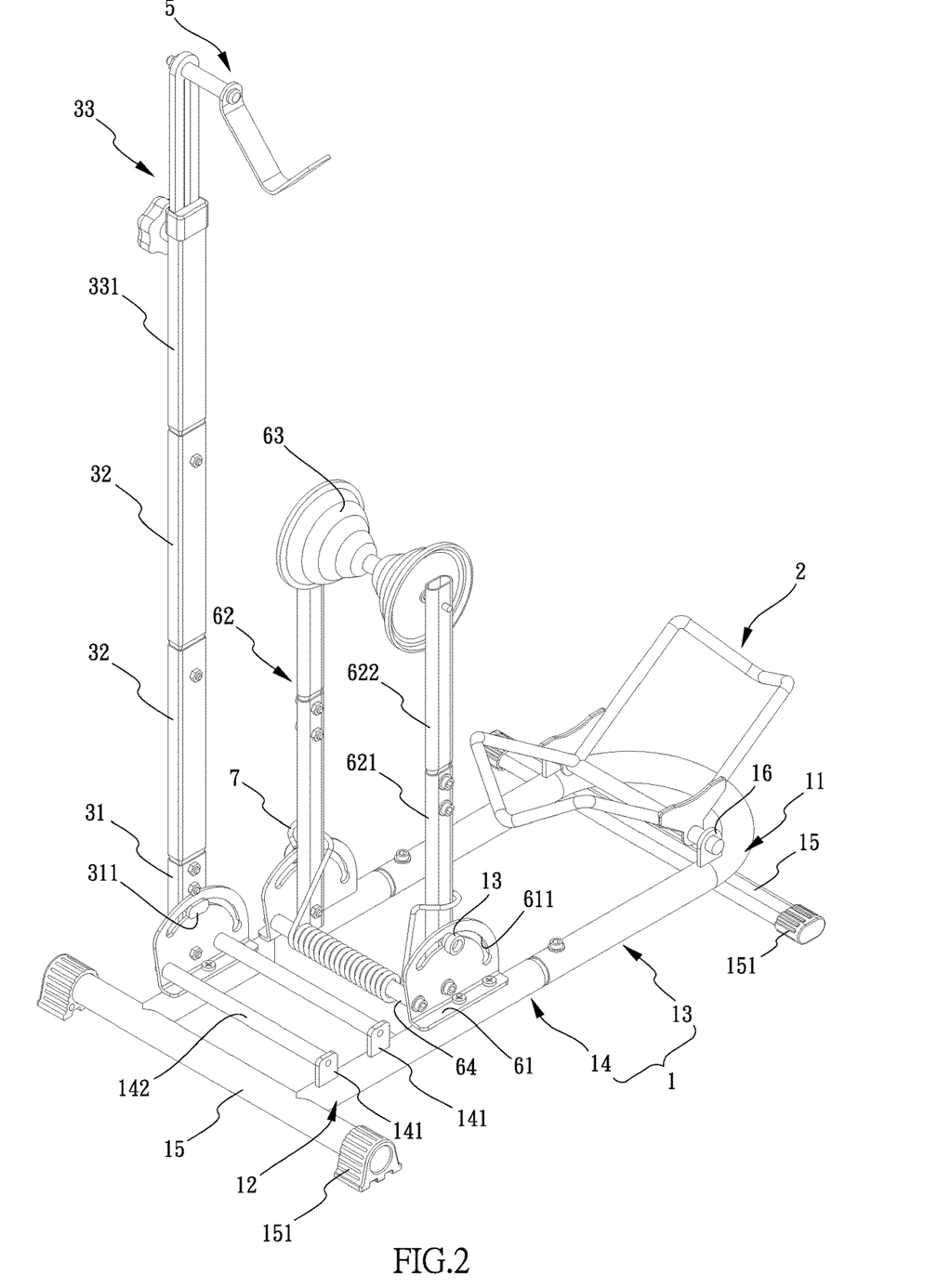
FIG. 2 is another perspective schematic view of the present invention from another angle.

To further stabilize the bicycle 100 in a standing configuration, the top surface of the rear base frame 14 is equipped with two reinforcing ribs 141 corresponding to the rear connecting plate 4. The two reinforcing ribs 141 are spaced apart, and each is further equipped with a reinforcing rod 142 between the reinforcing rib 141 and the rear connecting plate 4. The reinforcing rods 142 about against the rear connecting plate 4 and resist lateral forces when the bicycle 100 is placed, providing stable support for the bicycle 100 in standing configuration and preventing tilting due to lateral movement, as shown in FIG. 2.

Additionally, to stabilize the wheel and prevent lateral movement, the front frame assembly 2 further includes a placement rack 21 and two side connecting pieces 22. The placement rack 21 is hollow and includes an axle rod 211 and two wheel frame support rods 212 symmetrically arranged and connected to the axle rod 211. Each of the wheel frame support rods 212 has a wheel frame groove 213. The front end portion 11 of the base assembly 1 is further equipped with two pivoting pieces 16 corresponding to each other. Both ends of the axle rod 211 are pivotally mounted to the two pivoting pieces 16, respectively. The side connecting pieces 22 are assembled at the both ends of the axle rod 211 and are located between the wheel frame support rods 212 and the pivoting pieces 16 to primarily serve as a shield for the wheel of the bicycle 100. The placement rack 21, pivoting on the axle rod 211 as a pivot axis, allows the user to first insert the front wheel or rear wheel of the bicycle 100 into the wheel frame groove 213 for constraint and then to adjust the position of the bicycle 100 based on their preferences, either laying flat or standing, as shown in FIGS. 1 and 7-11.

For user convenience in disassembly of the bicycle parking device and standing and placing operations of the bicycle 100, each of the two side upright rods 62 further include a first rod 621 and a second rod 622. The first rod 621 of the side upright rod 62 has one end attached to the inner side of the respective middle connecting plate 61, with a plurality of bolts B each passing from the outer side of the respective middle connecting plate 61 into the respective middle arc guide hole 611 and being secured to the first rod 621. Each of the bolts B can move along the hole-shaped trajectory defined by the respective middle arc guide hole 611 and cause the pivot motion of the respective first rod 621. Further, the second rod 622 has one end detachably inserted to one end of the respective first rod, and the other end pivotally mounted at a respective one of the two ends of the bracing member 63. This allows the second rod 622 to be disassembled relative to the first rod 621 for convenient storage and transportation, saving space. Additionally, a middle rod 64 is further disposed between the two middle connecting plates 61, with both ends of the middle rod 64 connected to the inner sides of the middle connecting plates 61, respectively, and a reset spring 7 installed on the middle rod 64. Both ends of the reset spring 7 are engaged with the two side upright rods 62, respectively. As such, the reset spring 7 can provide elastic force to control the rebound after the middle frame assembly 6 pivots and elastic buffering to reduce the force during bicycle 100 placement, as shown in the various figures.

What is claimed is:

1. A bicycle parking structure, comprising:
   a base assembly, including a front end portion and a rear end portion;
   a front frame assembly, pivotally mounted at the front end portion and configured to support a front wheel or a rear wheel of a bicycle;
   a rear frame assembly, disposed at the rear end portion and including a base rod, at least one auxiliary rod and a telescopic rod, wherein (i) a top surface of the rear end portion is equipped with a rear connecting plate extending upwardly relative to the rear end portion, (ii) the rear connecting plate has a rear arc guide hole extending through on one side thereof, (iii) the base rod has one end with a side detachably and pivotally connected to the rear arc guide hole, (iv) the at least one auxiliary rod is detachably mounted at a top end of the base rod, (v) the telescopic rod is directly assembled to the top end of the base rod or to a top end of the at least one auxiliary rod, and (vi) the telescopic rod has a main rod and a secondary rod, with one end of the secondary rod being inserted into the main rod for up-down telescopic movement relative to the main rod, and the other end of the secondary rod being equipped with a support frame; and
   a middle frame assembly, disposed between the front frame assembly and the rear frame assembly and including two middle connecting plates, two side upright rods, and a bracing member, wherein the two middle connecting plates are disposed on and extend upwardly from the base assembly and each has a middle arc guide hole extending through one side thereof, and wherein each of the side upright rods has one end detachably and pivotally disposed at the corresponding middle arc guide hole and the other end to which a respective one of two ends of the bracing member is pivotally mounted.

2. The bicycle parking device as claimed in claim 1, wherein (i) the at least one auxiliary rod further includes an insertion part and a connecting part, (ii) the insertion part is detachably inserted into one end of the base rod, (iii) the main rod of the telescopic rod is inserted into the connecting part, (iv) the insertion part is provided with a plurality of insertion holes, and (v) a plurality of bolt members, equal in quantity to the insertion holes, are inserted from an outer side of the base rod into and through the insertion part.

3. The bicycle parking device as claimed in claim 1, wherein (i) the telescopic rod further includes a locking member, which includes a screw, a control handle and a nut, (ii) one end of the screw is connected to one side of the control handle, and the other end of the screw is inserted from an outer side of the main rod into and through an oblong hole of the secondary rod, (iii) the nut is embedded in an inner wall of the main rod, and (iv) the screw and the nut are threaded together to tighten the secondary rod between the control handle and the nut.

4. The bicycle parking device as claimed in claim 1, wherein (i) the support frame further includes a connecting segment and a deformed segment, (ii) the connecting segment has one end passing through and pivotally connected to a top end of the secondary rod and the other end connected to the deformed segment, (ii) the deformed segment extends outward from one end of the connecting segment and is bent to form a recessed groove, and (iii) a specific section of the deformed segment, which includes the recessed groove, is a rectangular sheet-like structure.

5. The bicycle parking device as claimed in claim 1, wherein (i) the base assembly further includes a front base frame and a rear base frame, (ii) the front base frame is U-shaped, and the rear base frame is H-shaped, (iii) the front base frame has two ends detachably connected to two ends on the same side of the rear base frame, and (iv) the front end portion is located at the front base frame, and the rear end portion is located at the rear base frame.

6. The bicycle parking device as claimed in claim 5, wherein a plurality of foot bases are further provided at a front edge bottom of the front base frame and at one end of the rear base frame, and each of the foot bases is covered with foot sleeves at both ends thereof.

7. The bicycle parking device as claimed in claim 5, wherein (i) a top surface of the rear base frame is equipped with two reinforcing ribs corresponding to the rear connecting plate, (ii) the two reinforcing ribs are spaced apart, and each is further equipped with a reinforcing rod between a respective one of the reinforcing ribs and the rear connecting plate, and (iii) the reinforcing rods about against the rear connecting plate and resist lateral forces when the bicycle is placed.

8. The bicycle parking device as claimed in claim 1, wherein (i) the front frame assembly further includes a placement rack and two side connecting pieces, (ii) the placement rack is hollow and includes an axle rod and two wheel frame support rods symmetrically arranged and connected to the axle rod, (iii) each of the wheel frame support rods has a wheel frame groove, (iv) the front end portion of the base assembly is further equipped with two pivoting pieces corresponding to each other, (v) both ends of the axle rod are pivotally mounted at the pivoting pieces, respectively, and (vi) the placement rack pivots on the axle rod as a pivot axis.

9. The bicycle parking device as claimed in claim 1, wherein (i) each of the two side upright rods further include a first rod and a second rod, (ii) the first rod has one end attached to an inner side of the respective middle connecting plate, with a plurality of bolts passing from an outer side of the respective middle connecting plate into the respective middle arc guide hole and secured to the respective first rod, (iii) each of the bolts is movable along a hole-shaped trajectory defined by the respective middle arc guide hole and causes pivot motion of the respective first rod, and (iv) the second rod has one end detachably inserted to one end of the respective first rod, and the other end pivotally mounted at a respective one of two ends of the bracing member.

10. The bicycle parking device as claimed in claim 1, wherein (i) a middle rod is further disposed between the two middle connecting plates, with both ends of the middle rod connected to inner sides of the middle connecting plates, respectively, and a reset spring installed on the middle rod, (ii) both ends of the reset spring are respectively engaged with the two side upright rods to enable an elastic force provided by the reset spring to control rebound after the middle frame assembly pivots.

\* \* \* \* \*